(12) United States Patent
Mahbub et al.

(10) Patent No.: US 11,256,956 B2
(45) Date of Patent: Feb. 22, 2022

(54) MULTI-STAGE NEURAL NETWORK PROCESS FOR KEYPOINT DETECTION IN AN IMAGE

(71) Applicant: QUALCOMM Incorporated, San Diego, CA (US)

(72) Inventors: Upal Mahbub, San Diego, CA (US); Rakesh Nattoji Rajaram, San Diego, CA (US); Vasudev Bhaskaran, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 157 days.

(21) Appl. No.: 16/700,219

(22) Filed: Dec. 2, 2019

(65) Prior Publication Data
US 2021/0166070 A1    Jun. 3, 2021

(51) Int. Cl.
*G06K 9/62* (2006.01)
*G06N 3/04* (2006.01)
*G06N 3/08* (2006.01)
*G06K 9/00* (2022.01)

(52) U.S. Cl.
CPC ......... *G06K 9/6232* (2013.01); *G06K 9/6261* (2013.01); *G06N 3/0454* (2013.01); *G06N 3/08* (2013.01); *G06K 9/00288* (2013.01)

(58) Field of Classification Search
CPC ............... G06K 9/6232; G06K 9/6261; G06K 9/00288; G06N 3/0454; G06N 3/08
USPC .......................................................... 382/158
See application file for complete search history.

(56) References Cited

U.S. PATENT DOCUMENTS

| | | | |
|---|---|---|---|
| 2011/0299782 A1* | 12/2011 | Hamsici | G06K 9/4671 382/195 |
| 2019/0172223 A1* | 6/2019 | Vajda | G06K 9/4633 |
| 2019/0278983 A1* | 9/2019 | Iqbal | G06K 9/00355 |
| 2021/0110180 A1* | 4/2021 | Wang | G06K 9/628 |

* cited by examiner

*Primary Examiner* — Juan A Torres
(74) *Attorney, Agent, or Firm* — The Marbury Law Group

(57) ABSTRACT

Embodiments include systems and methods for keypoint detection in an image. In embodiments, a processor of a computing device may apply to an image a first neural network that has been trained to define and output a plurality of regions. The processor may apply to each of the plurality of regions a respective second neural network to that has been trained to output a plurality of keypoints in each of the plurality of regions. The processor may apply to the plurality of keypoints a third neural network that has been trained to determine a correction for each of the plurality of keypoints to provide corrected keypoints suitable for the execution of an image processing function.

30 Claims, 15 Drawing Sheets

MULTI-STAGE NEURAL NETWORK PROCESS FOR KEYPOINT DETECTION IN AN IMAGE

BACKGROUND

Face keypoint detection (e.g., landmarks) is a process used in a wide variety of practical applications, such as face recognition, face-based authentication, face bokeh, animoji, face beautification, and face swapping. In conventional approaches, face keypoints are regressed directly from the images or obtained from heatmaps generated by a system or network trained using machine learning or deep learning approaches. However, such systems are computationally intensive, and the complexity of information increases computational requirements geometrically. As the number of facial keypoint that such systems must process increases, such systems are increasingly resource hungry, impractical for mobile computing device applications, and are not useful for on-chip implementations for real-time operation.

SUMMARY

Various aspects include systems and methods for keypoint detection in an image using a multi-stage neural network process that may be performed by a processor of a computing device. Various aspects may include applying to an image a first neural network that has been trained to define and output a plurality of regions, applying to each of the plurality of regions a respective second neural network that has been trained to output a plurality of keypoints in each of the plurality of regions, and applying to the plurality of keypoints a third neural network that has been trained to determine a correction for each of the plurality of keypoints to provide corrected keypoints suitable for execution of an image processing function.

Some aspects may include executing the image processing function based on the corrected keypoints. In some aspects, applying to an image a first neural network that has been trained to define a plurality of regions may include applying the first neural network to the image to determine a multi-dimensional global feature for the image. In some aspects, applying to each of the plurality of regions a respective second neural network that has been trained to output a plurality of keypoints in each of the plurality of regions may include applying the second neural network to the image to determine a multi-dimensional local feature for each of the plurality of regions.

In some aspects, applying to the plurality of keypoints a third neural network that has been trained to determine a correction for each of the plurality of keypoints to provide corrected keypoints suitable for the execution of an image processing function may include applying the third neural network to the plurality of keypoints and to one or more of a multi-dimensional global feature for the image and a multi-dimensional local feature for each of the plurality of regions to determine the correction for each of the plurality of keypoints. In some aspects, applying to an image a first neural network that has been trained to define a plurality of regions may include identifying in the image an image of portion of a human body, and segmenting the image of the portion of the human body into the plurality of regions.

In some aspects, applying to an image a first neural network that has been trained to define a plurality of regions may include applying the first neural network to determine one or more anchor points for each of the plurality of regions. In some aspects, applying to an image a first neural network that has been trained to define a plurality of regions may include applying the first neural network to define for each of the plurality of regions a smallest bounding box that includes keypoints to be determined from each region. In some aspects, each second neural network may be trained to output keypoints for its respective region. In some aspects, applying to each of the plurality of regions a respective second neural network that has been trained to output a plurality of keypoints in each of the plurality of regions may be performed in parallel.

Further aspects may include a computing device including a memory and a processor coupled to the memory and configured with processor-executable instructions to perform operations of any of the methods described above. Further aspects may include processor-readable storage media upon which are stored processor executable instructions configured to cause a controller of a computing device to perform operations of any of the methods described above. Further aspects may include a computing device including means for performing functions of any of the methods described above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of some embodiments.

DETAILED DESCRIPTION

Figure 1:
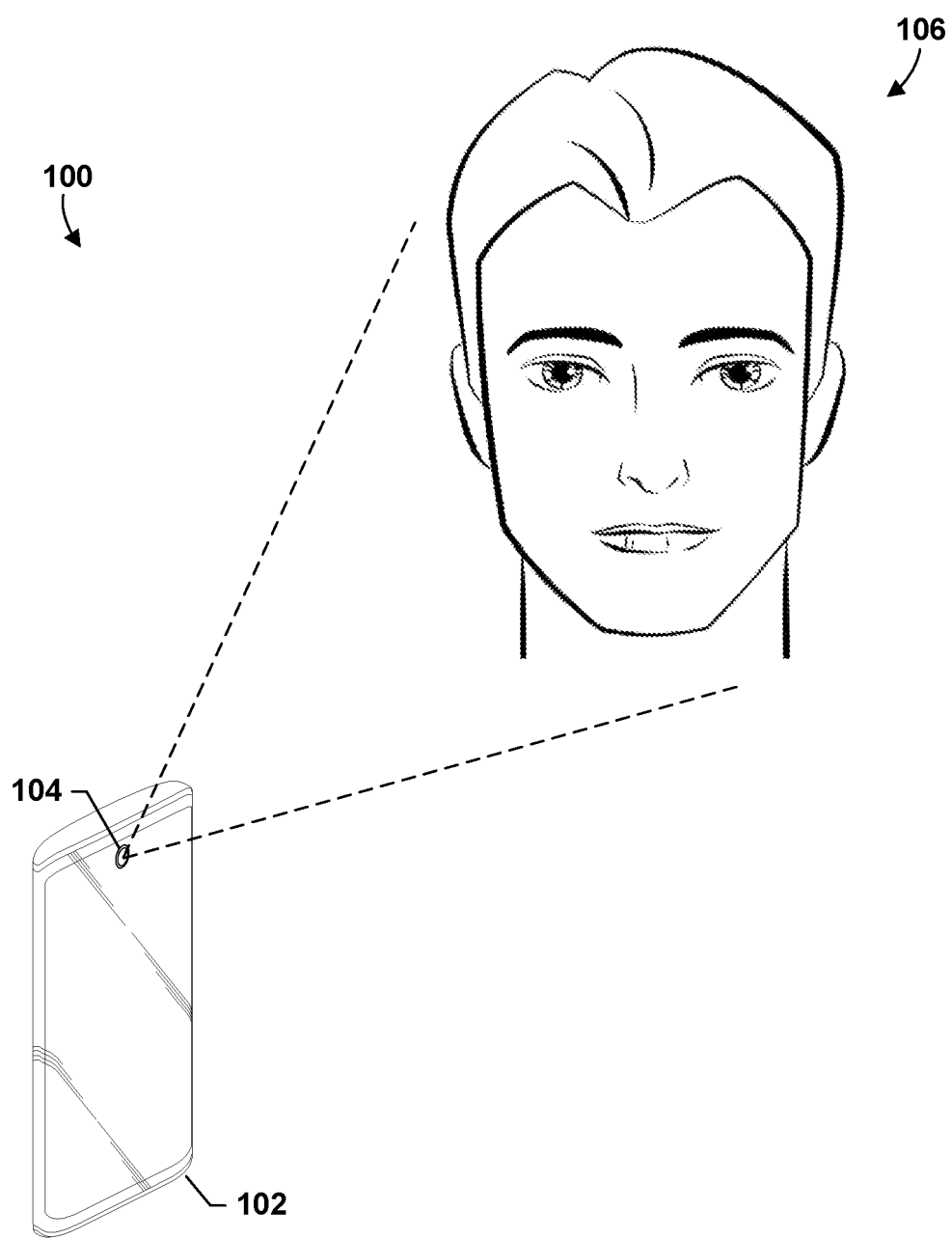
FIG. 1 is a system block diagram illustrating an example system suitable for implementing any of the various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of various embodiments or the claims.

Various embodiments provide methods for identifying keypoints in images, such as images of faces or other body parts, that are suitable for implementation in resource limited devices, such as mobile computing devices. Various embodiments include using a first neural network process to segment an image into a plurality of image segments, using a second neural network process to identify a keypoint in each image segment, and using a third neural network process to correct for errors or distortions in keypoint locations resulting from the second neural network process. Segmenting an image and applying neural networks trained for each segment to identify one or a few keypoints in each segment enables the use of neural network processes that can be performed on resource limited computing devices, while applying the third neural network process to the output of the second neural network process provides corrections for distortions or errors introduce by processing an image in segments.

The terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

The term "computing device" is used herein to refer to any one or all of cellular telephones, smartphones, portable computing devices, personal or mobile multi-media players, laptop computers, tablet computers, smartbooks, ultrabooks, palmtop computers, electronic mail receivers, multimedia Internet-enabled cellular telephones, router devices, medical devices and equipment, biometric sensors/devices, wearable devices including smart watches, smart clothing, smart glasses, smart wrist bands, smart jewelry (e.g., smart rings, smart bracelets, etc.), entertainment devices (e.g., gaming controllers, music and video players, satellite radios, etc.), Internet of Things (IoT) devices including smart meters/sensors, industrial manufacturing equipment, large and small machinery and appliances for home or enterprise use, computing devices within autonomous and semiautonomous vehicles, mobile devices affixed to or incorporated into various mobile platforms, global positioning system devices, and similar electronic devices that include a memory and a programmable processor.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single wireless device. The proximity of the SOCs facilitates high speed communications and the sharing of memory and resources.

The term "multicore processor" may be used herein to refer to a single integrated circuit (IC) chip or chip package that contains two or more independent processing cores (e.g., CPU core, Internet protocol (IP) core, graphics processor unit (GPU) core, etc.) configured to read and execute program instructions. A SOC may include multiple multi-core processors, and each processor in an SOC may be referred to as a core. The term "multiprocessor" may be used herein to refer to a system or device that includes two or more processing units configured to read and execute program instructions.

Keypoint detection in an image, such as detecting facial landmarks, is enabling process for practical applications such as facial recognition, face-based authentication, photo/image processing, and a variety of other consumer applications. Conventional approaches involve regressing key points directly from an image obtained from heatmaps generated by a system or network trained using machine learning or deep learning approaches. However, the complexity of these computational systems increases non-linearly, and as requirements for accuracy and data processing increase, such systems are increasingly not viable for on-chip implementations for real-time operations. For example, conventional approaches may use a single convolutional neural network to generate a large number of landmarks for an image, which requires a large neural network to handle such complexity. Such a network is highly resource intensive, and thus not suitable for implementation in resource limited computing devices, such as smartphone and tablet computers. Further such methods may not be further scalable.

Various embodiments include systems and methods of keypoint detection in an image that is suitable for execution on resource limited computing devices and may be more scalable than conventional approaches. Implementations may be applied to a variety of practical applications, such as face recognition, hand joint detection, human body joint detection, photo enhancement, image processing, and other various applications.

In various embodiments, a processor of a computing device may apply a first neural network to an image data file to define a plurality of regions. In some embodiments, the first neural network that is to an image data file may be a neural network that has been trained to identify in image data a portion of a human body (e.g., a face, a joint, a limb, etc.) and to segment the portion of the human body into a plurality of image segments or regions. For example, the first neural network may be trained with a suitable training data set to segment an image of a face into multiple regions or image segments that will contain a suitable keypoint, such as regions containing the eyes, a region containing the nose, regions containing cheekbones, one or more regions containing the lips, etc. In some embodiments, the first neural network may be trained to determine one or more anchor points for each of the plurality of regions, and to define for each of the plurality of anchor points a smallest bounding box within the image that includes keypoints to be determined from each region. The bounding boxes may define image segments that will be processed separately in a second neural network process. In some embodiments, the processor may apply the first neural network to the image to determine a multi-dimensional global feature for the image.

In some embodiments, the processor of the computing device may apply to each of the plurality of image segments a second neural network to obtain a plurality of keypoints in each of the plurality image segments. In some embodiments, the second neural network applied to each region may be specifically trained for that region or image segments. For example, after the first neural network processes has segmented an image of a face into multiple of regions image segments (e.g., an eyebrow region, an eye region, a nose region, etc.), the processor may apply to each segment a second neural network that is trained to locate a key point in a respective region of a face, such as a second neural network trained to find keypoints within eyebrow regions of a face image, a second neural network trained to find keypoints within eye regions of a face image, a second neural network that is trained to find keypoints within nose regions of a face image, and so forth. In some embodiments, each of the second neural networks may identify a plurality of keypoints in each of the plurality of regions. In some embodiments, each of the second neural networks may also obtain local features for each of the plurality of regions. By applying second neural networks that are trained for specific regions of an image (e.g., trained for specific regions on a human face) to image segments encompassing such regions, the neural network processes may be of a size and complexity that they can be applied by a resource limited computing device. The application of a plurality of the second neural networks to a plurality of image segments may be performed in series, in parallel or partially in series and partially in parallel, depending on the resources available (e.g., processing capacity and working memory).

In various embodiments, the processor of the computing device may apply to the plurality of keypoints a third neural network that has been trained to determine corrections for each of the plurality of keypoints output by the second neural network process. Segmenting an image into regions and separately identifying keypoints within each region or segment may introduce distortions or errors in the locations of keypoints compared to the locations of keypoints that would be obtained by a whole-image (e.g., whole face) process. To address this potential, the processor may apply the third neural network to the keypoints to determine a position correction for each of the plurality of keypoints, thereby generating a corrected set of keypoints that are suitable for the execution of an image processing function. In some embodiments, the third neural network may use a multi-dimensional global feature for the image (e.g., the multi-dimensional global feature for the image determined by the first neural network) to determine appropriate location corrections for each of the plurality of keypoints. Additionally or alternatively, in some embodiments, the third neural network may use a multi-dimensional local feature for each of the plurality of regions (e.g., the multi-dimensional local feature determined by each second neural network for each respective region) to determine the correction for each of the plurality of keypoints.

In various embodiments, the processor may use the corrected keypoints to execute an image processing function. Such image processing function may include, for example, facial recognition, face-based authentication, hand joint detection, body joint detection, photo enhancement, photo filters (e.g., adding a hat, mustache, etc. to an image of a face), or another suitable image processing function.

Various embodiments improve the operation of computing devices configured to implement keypoint detection systems by decreasing the computational intensity required to detect keypoints in an image, thereby increasing the efficiency and speed of such systems, and enabling the keypoint location process to be accomplished on resource limited devices. Various embodiments improve the operation of computing devices configured to implement keypoint detection systems by increasing the scalability of such systems. Various embodiments enable the rapid and efficient processing of increased amounts of information and the detection of a greater number of landmarks in an image, thereby increasing the accuracy and usefulness of such systems.

FIG. 1 illustrates an example system 100 suitable for implementing any of the various embodiments. The system 100 may include a computing device 102 configured to implement a keypoint detection system. The computing device 102 may include one or more image sensors such as a camera 104. The camera 104 may be directed to capture an image, for example, of a body or portion of the body, such as a face 106. The system 100 may be implemented in a wide variety of embodiments, and it will be appreciated that the illustration of the computing device 102 as smart phone in FIG. 1 is not a limitation on possible implementations. Similarly, the system 100 may be applied to a variety of images and is not limited to images of a face.

Figure 2:
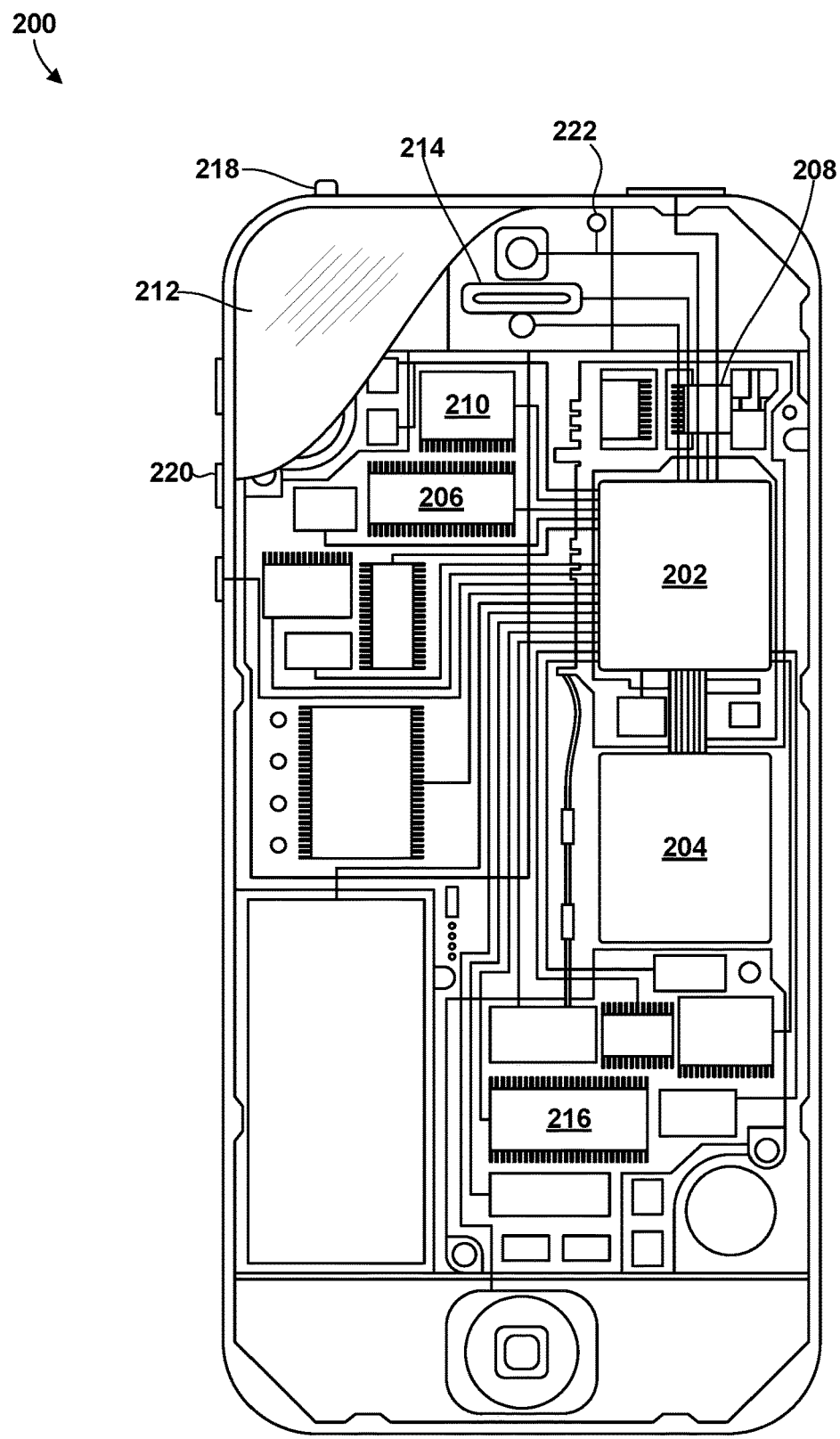
FIG. 2 is a component block diagram illustrating a computing device suitable for implementing any of the various embodiments.

FIG. 2 is a component block diagram of an example computing device 200 suitable for implementing any of the various embodiments. With reference to FIGS. 1 and 2, the computing device 200 may include a first System-On-Chip (SOC) processor 202 (such as a SOC-CPU) coupled to a second SOC 204 (such as a 5G capable SOC). The first and second SOCs 202, 204 may be coupled to internal memory 206, 216, a display 212, and to a speaker 214. Additionally, the computing device 200 may include an antenna 218 for sending and receiving electromagnetic radiation that may be connected to a wireless data link and/or wireless transceiver 208 coupled to one or more processors in the first and/or second SOCs 202, 204. The one or more processors may be configured to determine signal strength levels of signals received by the antenna 218. The computing device 200 may also include menu selection buttons or rocker switches 220 for receiving user inputs. In addition, soft virtual buttons may be presented on display 212 for receiving user inputs.

The computing device 200 may also include a sound encoding/decoding (CODEC) circuit 210, which digitizes sound received from a microphone into data packets suitable for wireless transmission and decodes received sound data packets to generate analog signals that are provided to the speaker to generate sound. Also, one or more of the processors in the first and second SOCs 202, 204, wireless transceiver 208 and CODEC 210 may include a digital signal processor (DSP) circuit (not shown separately). The computing device 200 may also include one or more optical sensors 222, such as a camera. The optical sensors 222 may be coupled to one or more processors in the first and/or second SOCs 202, 204 to control operation of and to receive information from the optical sensor(s) 222 (e.g., images, video, and the like).

The processors (e.g., SOCs 202, 204) of the computing device 200 may be any programmable microprocessor, microcomputer or multiple processor chip or chips that can be configured by software instructions (applications) to perform a variety of functions, including the functions of the various embodiments described below. In some wireless devices, multiple processors may be provided, such as one processor within an SOC 204 dedicated to wireless communication functions and one processor within an SOC 202 dedicated to running other applications. Typically, software applications including processor-executable instructions may be stored in non-transitory processor-readable storage media, such as the memory 206, 216, before the processor-executable instructions are accessed and loaded into the processor. The processors 202, 204 may include internal memory sufficient to store the application software instructions. The mobile device 102 may also include optical sensors such as a camera (not shown).

Figure 3:
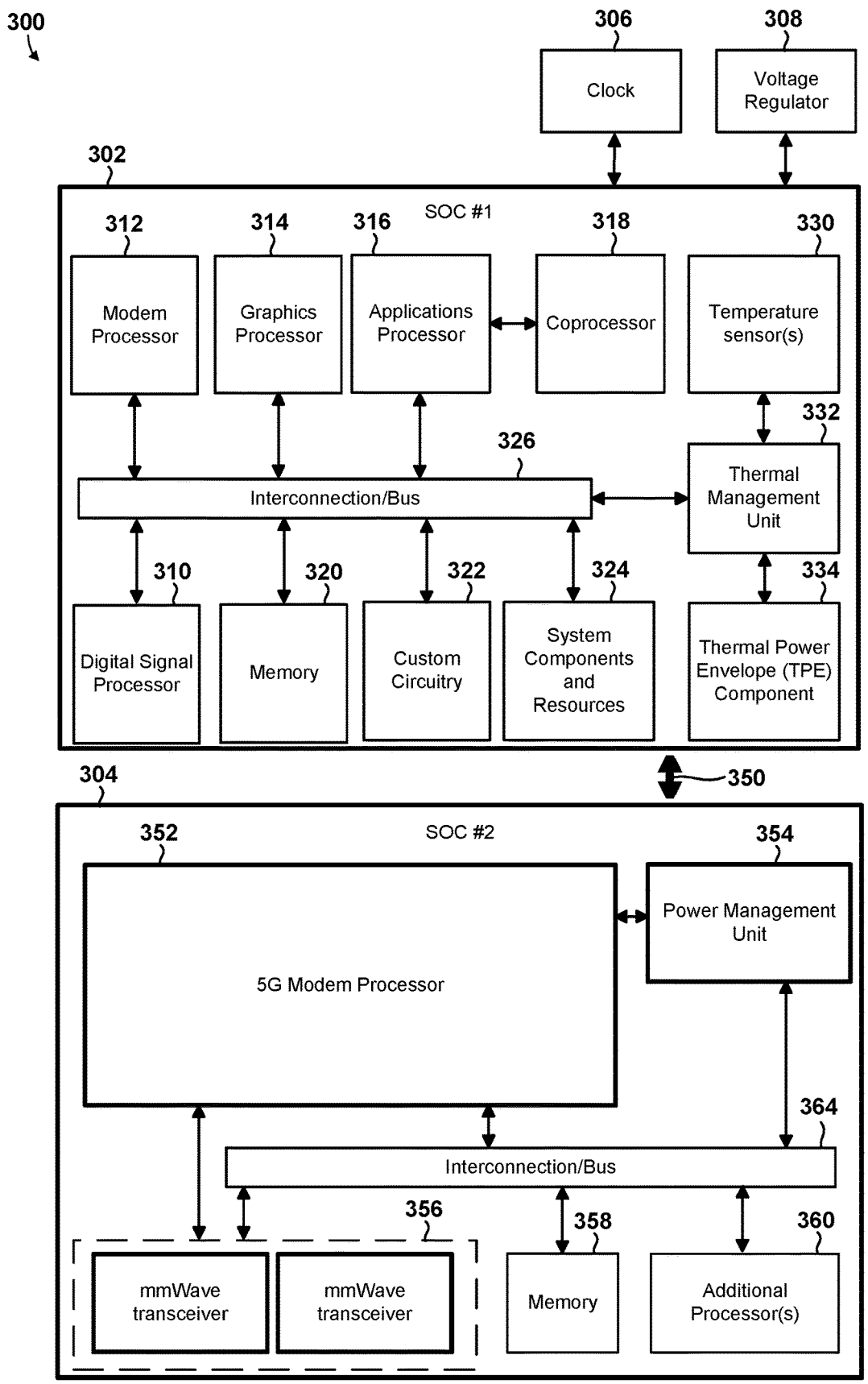
FIG. 3 is a component block diagram illustrating computing device components suitable for implementing any of the various embodiments.

Various embodiments may be implemented on a number of single processor and multiprocessor computer systems, including a system-on-chip (SOC) or system in a package (SIP). FIG. 3 illustrates an example computing system or SIP 300 architecture that may be used in wireless devices implementing the various embodiments.

With reference to FIGS. 1-3, the illustrated example SIP 300 includes a two SOCs 302, 304, a clock 306, and a voltage regulator 308. In some embodiments, the first SOC 302 operate as central processing unit (CPU) of the wireless device that carries out the instructions of software application programs by performing the arithmetic, logical, control and input/output (I/O) operations specified by the instructions. In some embodiments, the second SOC 304 may operate as a specialized processing unit. For example, the second SOC 304 may operate as a specialized 5G processing unit responsible for managing high volume, high speed (e.g., 5 Gbps, etc.), and/or very high frequency short wave length (e.g., 28 GHz mmWave spectrum, etc.) communications.

The first SOC 302 may include a digital signal processor (DSP) 310, a modem processor 312, a graphics processor 314, an application processor 316, one or more coprocessors 318 (e.g., vector co-processor) connected to one or more of the processors, memory 320, custom circuity 322, system components and resources 324, an interconnection/bus module 326, one or more temperature sensors 330, a thermal management unit 332, and a thermal power envelope (TPE) component 334. The second SOC 304 may include a 5G modem processor 352, a power management unit 354, an interconnection/bus module 364, a plurality of mmWave transceivers 356, memory 358, and various additional processors 360, such as an applications processor, packet processor, etc.

Each processor 310, 312, 314, 316, 318, 352, 360 may include one or more cores, and each processor/core may perform operations independent of the other processors/cores. For example, the first SOC 302 may include a processor that executes a first type of operating system (e.g., FreeBSD, LINUX, OS X, etc.) and a processor that executes a second type of operating system (e.g., MICROSOFT WINDOWS 10). In addition, any or all of the processors 310, 312, 314, 316, 318, 352, 360 may be included as part of a processor cluster architecture (e.g., a synchronous processor cluster architecture, an asynchronous or heterogeneous processor cluster architecture, etc.).

The first and second SOC 302, 304 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 324 of the first SOC 302 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 324 and/or custom circuitry 322 may also include circuitry to interface with peripheral devices, such as cameras, electronic displays, wireless communication devices, external memory chips, etc.

The first and second SOC 302, 304 may communicate via interconnection/bus module 350. The various processors 310, 312, 314, 316, 318, may be interconnected to one or more memory elements 320, system components and resources 324, and custom circuitry 322, and a thermal management unit 332 via an interconnection/bus module 326. Similarly, the processor 352 may be interconnected to the power management unit 354, the mmWave transceivers 356, memory 358, and various additional processors 360 via the interconnection/bus module 364. The interconnection/bus module 326, 350, 364 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SOCs 302, 304 may further include an input/output module (not illustrated) for communicating with resources external to the SOC, such as a clock 306 and a voltage regulator 308. Resources external to the SOC (e.g., clock 306, voltage regulator 308) may be shared by two or more of the internal SOC processors/cores.

In addition to the example SIP 300 discussed above, various embodiments may be implemented in a wide variety of computing systems, which may include a single processor, multiple processors, multicore processors, or any combination thereof.

Figure 4:
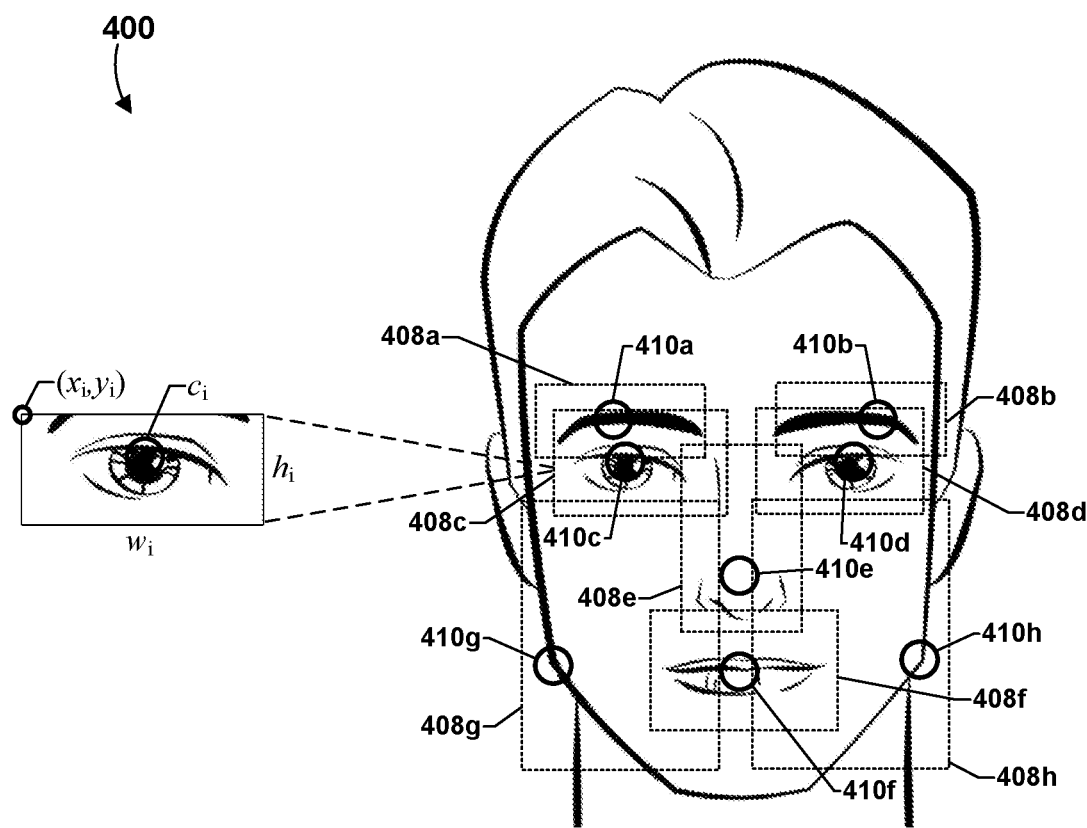
FIG. 4 is a conceptual diagram illustrating aspects of a method for keypoint detection in an image in accordance with various embodiments.
Figure 4:
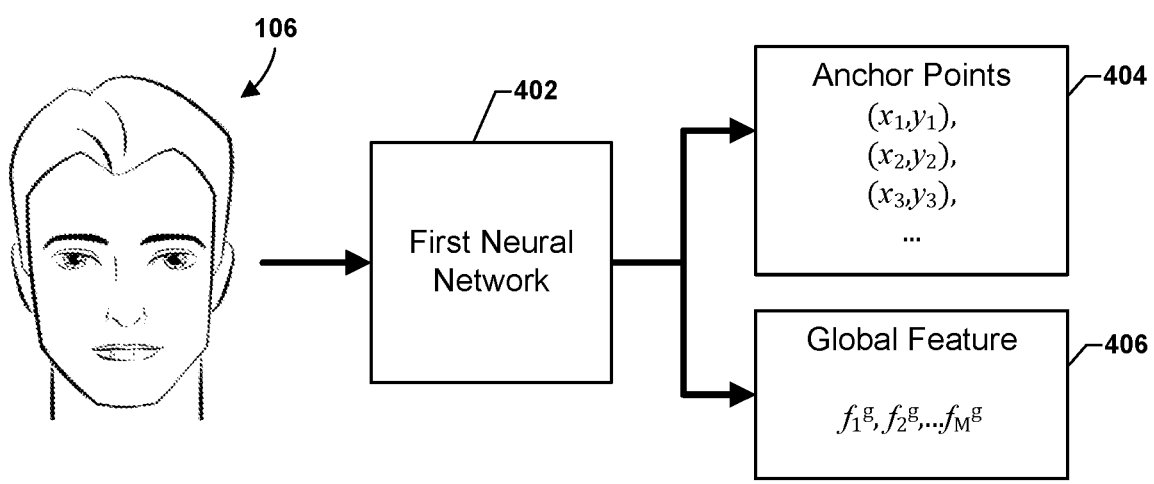

FIG. 4 is a conceptual diagram illustrating aspects of a method 400 for keypoint detection in accordance with various embodiments. With reference to FIGS. 1-4, in various embodiments, a processor (e.g., 202, 204) of a computing device (e.g., 102) may apply a first neural network 402 to an image to define a plurality of regions.

In some embodiments, the first neural network 402 may identify within the image a portion that includes in particular a human body part (e.g., a face, a joint, a limb, etc.). The first neural network 402 may be generated by training a neural network on an image data set that includes a body part of interest (e.g., faces) and that provides examples of appropriate segmentations of the body part into regions that will contain keypoints. Applying a first neural network 402 that has been trained in this manner to an image file, will thus result in an output that identifies regions within the image likely to contain keypoints consistent with the training data set. In some embodiments, the first neural network 402 may be trained to segment the portion of the image including the human body part into a plurality of regions, such as regions 408a-408h. In some embodiments, the first neural network 402 may be trained to determine one or more anchor points 404 for each of the plurality of regions, such as anchor points 410a-410h, each having a location or coordinate value (which may, for example, be expressed as x,y coordinates). In some embodiments, the first neural network 402 may be trained to define a predetermined number of networks.

In some embodiments, the first neural network 402 may be trained to define for each of the plurality of regions a smallest bounding box that includes keypoints to be determined from each region. In some embodiments, for each region, based on keypoints to be determined from that region, the smallest bounding box that encapsulates or includes those keypoints may be determined by the first neural network processing of the image file. In some embodiments, the first neural network 402 may be trained to perform a regression to determine the smallest bounding box that includes keypoints to be determined for each region. In some embodiments, the first neural network 402 may be trained to define for each region (i) a corner (x, y) (e.g., for a top left corner), a width (w), and a height (h) of a bounding box. In some embodiments, this may be expressed as or ($x_i$, $y_i$, $h_i$). In some embodiments, the first neural network may be trained to define a center (c), a width (w), and a height (h) of a bounding box for each region (i). In some embodiments, this may be expressed as ($c_i$, $w_i$, $h_i$). In some embodiments, the center (c) of a bounding box for region (i) may be expressed as:

$$c_i = x_i + \frac{w_i}{2}, y_i + \frac{h_i}{2} \qquad \text{Equation 1}$$

In some embodiments, the first neural network 402 may be trained to define a center for each region, and make values for the height and width of each region constant. For example, the first neural network may be trained to analyze distributions of $w_i$ and $h_i$ and select values for the height that include or encapsulate, for example, at least 95% of the keypoints to be determined for a region.

In some embodiments, the first neural network 402 may be trained to determine a multi-dimensional global feature 406 for the image. In some embodiments, the global feature 406 may include M dimensions or features of the image. In some embodiments, the global feature 406 may be expressed as $f_1^g, f_2^g, \ldots f_M^g$ in which f represents a value of a feature.

Figure 5:
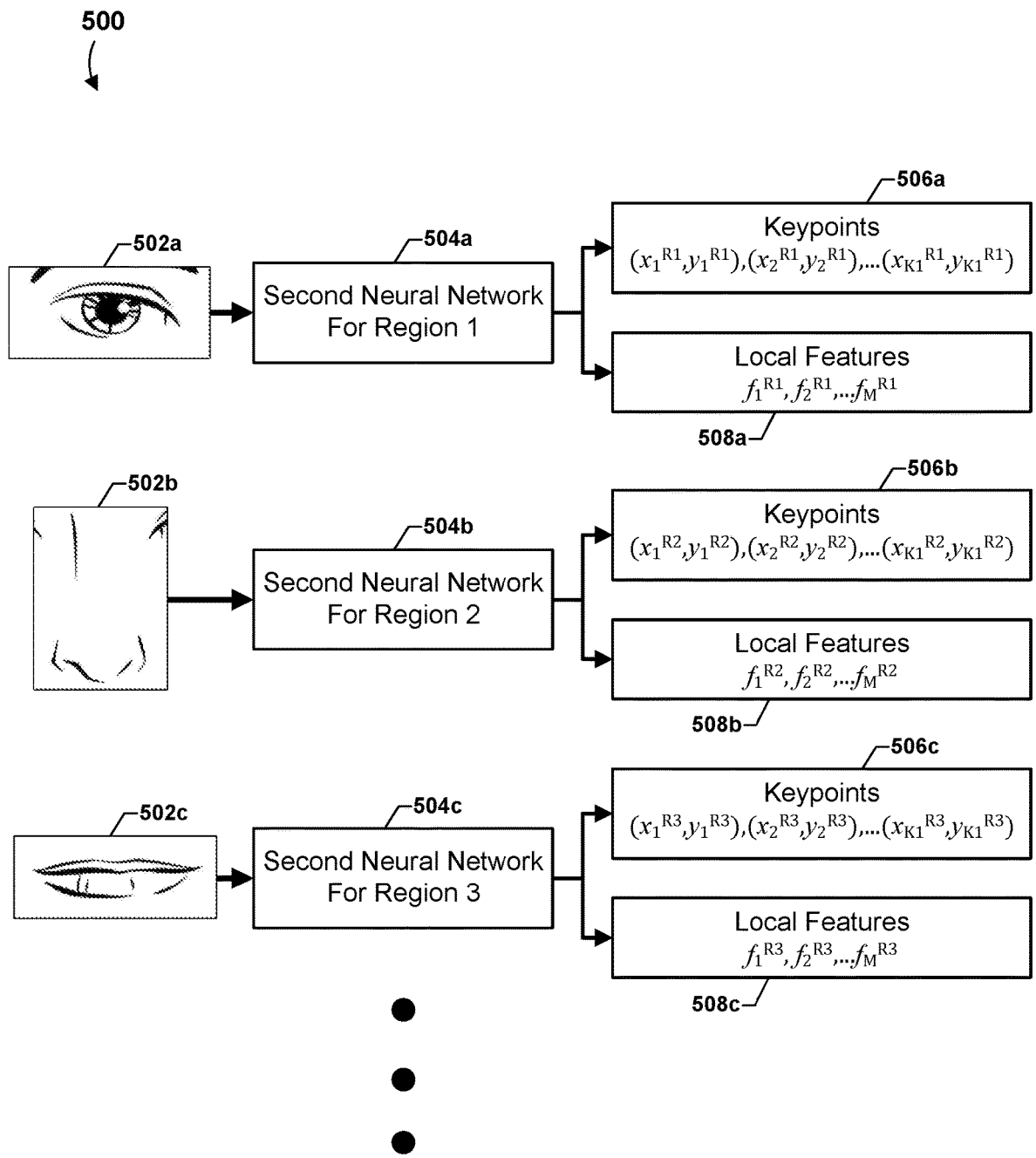
FIG. 5 is a conceptual diagram illustrating aspects of a method for keypoint detection in an image in accordance with various embodiments.

FIG. 5 is a conceptual diagram illustrating aspects of a method 500 for keypoint detection in accordance with various embodiments. With reference to FIGS. 1-5, in various embodiments, a processor (e.g., 202, 204) of a computing device (e.g., 102) may apply a second neural network to each of the plurality of regions determined by the first neural network to obtain a plurality of keypoints for each region.

In some embodiments, the processor of the computing device may apply to each of the plurality of regions (e.g., the regions 408a-408h) a second neural network to obtain a plurality of keypoints in each of the plurality regions. In some embodiments, the second neural network applied to each region may be specifically trained to locate a keypoint within that region. For example, the image of the face 106 may be segmented into a variety of regions, such as an eye region 502a, a nose region 502b, a mouth region 502c, etc. and a second neural network may be trained to locate keypoints in each of the various regions. For example, the processor may apply a second neural network that is trained for eye regions 504a to the eye region 502a of the image, a second neural network that is trained for nose regions 504b to the nose region 502b of the image, a second neural network that is trained for mouth regions 504c to the mouth region 502c of the image, and so forth. In some embodiments, each of the second neural networks may be trained to output a plurality of keypoints 506a-506c in each of the plurality of regions 502a-502c. In some embodiments, each of the second neural networks may be trained such that each of the output keypoints may have a location or coordinate value. In some embodiments, each of the second neural networks may be trained such that a keypoint location may be expressed as x, y coordinates, for example, ($x_1^{R1}, y_1^{R1}$) in which R1 represents a first region (e.g., the region 502a). In some embodiments, each of the second neural networks may be trained such that the determined keypoints for each region may include errors or inaccuracies, which may be represented as a regional loss in each region. For example, a regional loss ($L_R$) for each determined keypoint (i) may be represented as:

$$L_{R_i} = \sum_{j=1}^{K_j} |P_j^{R_i} - \bar{P}_i^{R_i}|^\gamma \qquad \text{Equation 2}$$

in which $P_j^{R_i} = (x_j^{R_i}, y_j^{R_i})$ represents a ground truth and $\bar{P}_i^{R_i} = (\bar{x}_i^{R_i}, \bar{y}_i^{R_i})$ represents an estimated keypoint, and γ determines the norm. In some embodiments, the norm γ can be 1 or 2. In some embodiments, the loss can be a piecewise combination of different norms. In some embodiments, an instance of the second neural network may be trained for a specific region $R_i$ in such a way that the loss $L_{R_i}$ is minimized, e.g., using a standard forward and backward propagation approach.

In some embodiments, each of the second neural networks may be trained to output local features 508a-508c for each of the plurality of regions 502a-502c. In some embodiments, each of the second neural networks may be trained such that the local features 508a-508c of each region 502a-502c may include M dimensions or features of the respective region. In some embodiments, each of the second neural networks may be trained such that the local features may be expressed as $f_1^{R1}, f_2^{R1}, \ldots f_M^{gR1}$ in which f represents a value of a feature. In some embodiments, the value of M can be different for different regions. For example, in some embodiments, the length of the features may vary among different regions, which may be expressed as $M_{Ri}$.

Figure 6:
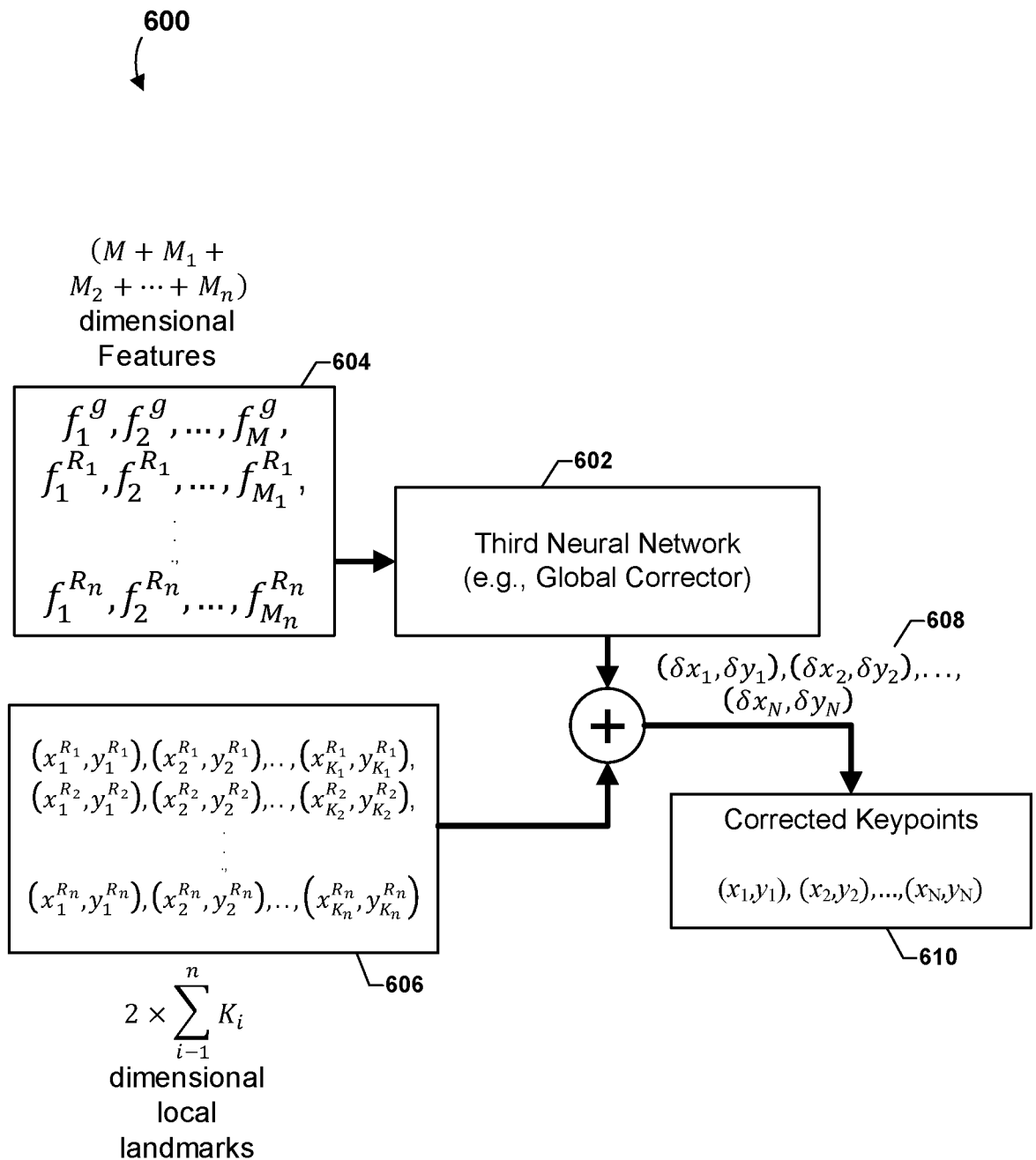
FIG. 6 is a conceptual diagram illustrating aspects of a method for keypoint detection in an image in accordance with various embodiments

FIG. 6 is a conceptual diagram illustrating aspects of a method 600 for keypoint detection in accordance with various embodiments. With reference to FIGS. 1-6, in various embodiments, a processor (e.g., 202, 204) of a computing device (e.g., 102) may apply a third neural network 602 to the plurality of keypoints (e.g., the keypoints 506a-506c) that has been trained to determine a correction 608 for each of the plurality of keypoints to output corrected keypoints 610 suitable for the execution of an image processing function. In some embodiments, the third neural network 602 may function as a global corrector to determine the correction 608 for each of the plurality of keypoints.

In some embodiments, the third neural network 602 may use one or more features 604 of the image to determine the correction 608 for each of the plurality of keypoints. In some embodiments, the third neural network 602 may be trained to use a multi-dimensional global feature for the image (e.g., the multi-dimensional global feature 406 for the image determined by the first neural network 402) to determine the correction 608 for each of the plurality of keypoints. Additionally or alternatively, in some embodiments, the third neural network 602 may be trained to use a multi-dimensional local feature for each of the plurality of regions (e.g., the multi-dimensional local features 508a-508c determined by each second neural network for each respective region R) to determine the correction 608 for each of the plurality of keypoints. In some embodiments, the corrections 608 may be expressed as delta or change values for each coordinate, such as $\delta x_1, \delta y_1, \delta x_2, \delta y_2, \ldots, \delta x_N, \delta y_N$ up to N coordinates.

In some embodiments, the corrections 608 determined by the third neural network 602 may correct for distortions or inaccuracies that arise when the plurality of keypoints 606 obtained by each of the second neural networks are processed collectively, assembled, or combined for processing by application of the third neural network 602. In some embodiments, the one or more features 604 may each be of different lengths (M) for each of (i) number of regions (R), which may be expressed as $M_{Ri}$.

In various embodiments, the processor may use the corrected keypoints 610 to execute an image processing function.

Figure 7:
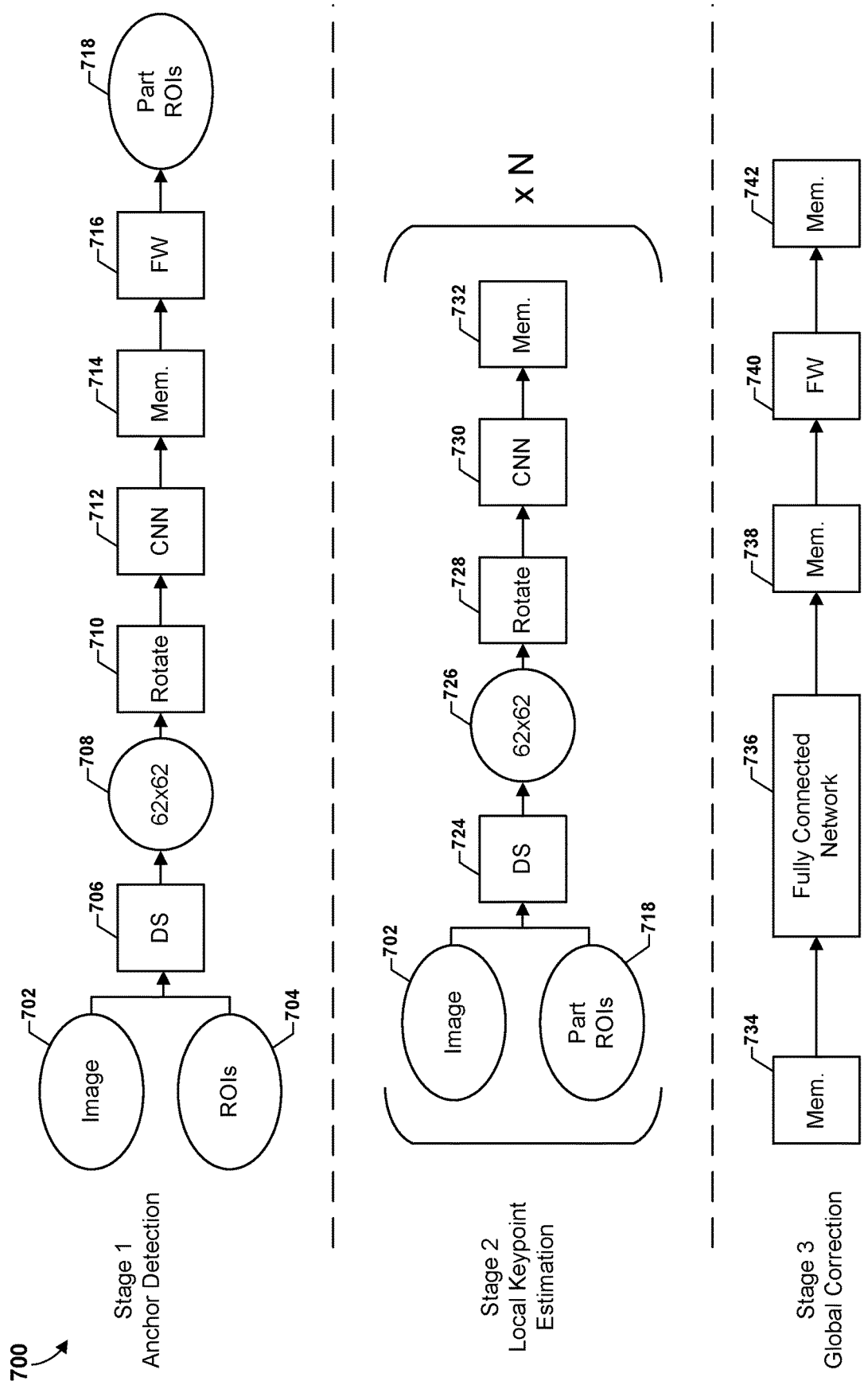
FIG. 7 is a conceptual diagram illustrating an example pipeline suitable for implementing any of the various embodiments.

FIG. 7 is a conceptual diagram illustrating an example pipeline 700 suitable for implementing any of the various embodiments. With reference to FIGS. 1-7, in various embodiments, a processor (e.g., 202, 204) of a computing device (e.g., 102) may execute the operations of the pipeline 700 as further described below. In some embodiments, the pipeline 700 may include a first stage (Stage 1) for detection of anchor points of a plurality of regions of an image, a second stage (Stage 2) for determination or estimation of keypoints local to each of the plurality of regions, and a third stage (Stage 3) for determination of corrections for the keypoints.

The first stage may receive an image 702 and generated or segmented regions of interest (ROIs) 704 from the image 702 (for example, outputs from a face detection process). The image 702 may include a full or complete image (e.g., the image 106). The ROIs 704 may, in some embodiments, include outputs from a module configured to detect a portion of a human body (e.g., a face, hand joint, etc.). A down-sampler (DS) operation 706 may receive the image and the ROIs, and may provide a down-sampled image output and the ROIs to a crop and resizing operation 708. The crop and resizing operation 708 may perform image cropping and resizing operations. A rotation operation 710 may rotate the image. For example, body portions such as faces may not be centered in an image, may be rotated at an angle, and the like. Operations 706, 708, and 710 may function to standardize a captured image.

The output of the rotation operation 710 may be provided to a convolutional neural network 712. In some embodiments, the convolutional neural network 712 may identify, detect, or determine one or more anchor points within the image 702 and/or the ROIs 704. In some embodiments, the convolutional neural network 712 may determine an M-dimensional feature within the image 702 and/or the ROIs 704. The one or more anchor points and/or the M-dimensional feature output by the convolutional neural network 712 may be stored in a memory 714. The one or more anchor points may be subject to a firmware processing operation 716. In some embodiments, the output of the firmware processing operation 716 may include regional or part ROIs 718.

The second stage may be performed N number of times for each identified region of the image (e.g., the regions 408a-408h). Each second stage may receive the image 702 and the part or local ROIs 718 for a region N. A down-sampler (DS) operation 724 may receive the image and the part ROIs and may provide a down-sampled image output and the ROIs to a crop and resizing operation 708 to a crop and resizing operation 726. The crop and resizing operation 726 may perform image cropping and resizing operations. A rotation operation 728 may rotate the image. The output of the rotation operation 728 may be provided to a convolutional neural network 730. In some embodiments, the convolutional neural network 730 may identify, detect, or determine one or more keypoints, such as face landmarks, within the region N. In some embodiments, the convolutional neural network 730 may determine an M-dimensional feature within the region N. The one or more keypoints and/or the M-dimensional feature output by the convolutional neural network 730 may be stored in a memory 732.

The third stage may obtain the one or more keypoints, the global feature, and/or the local features from memory 734 and provide the keypoints, the global feature, and/or the local features to a fully connected network 736. In some embodiments, the third state may generate or determine a concatenated feature vector based on the keypoints and provide the concatenated feature vector to the fully connected network 736. In some embodiments, the fully connected network 736 may function as a global corrector network and may determine corrections to the one or more keypoints. The corrections may be stored in a memory 738, subject to a firmware processing operation 740, and the corrected keypoints may be stored in a memory 742. In some embodiments the firmware processing operation 740 may add deltas produced by the global corrector to the local keypoint values to determine the corrected keypoints.

Figure 8:
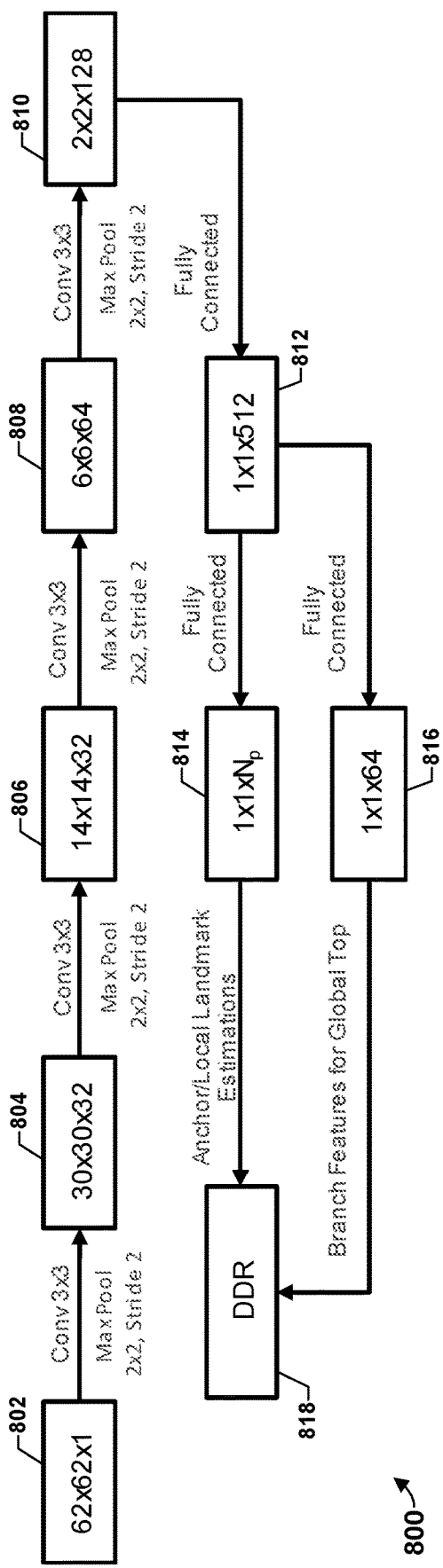
FIGS. 8 and 9 are conceptual diagrams illustrating example implementations of neural networks for implementing any of the various embodiments.
Figure 9:
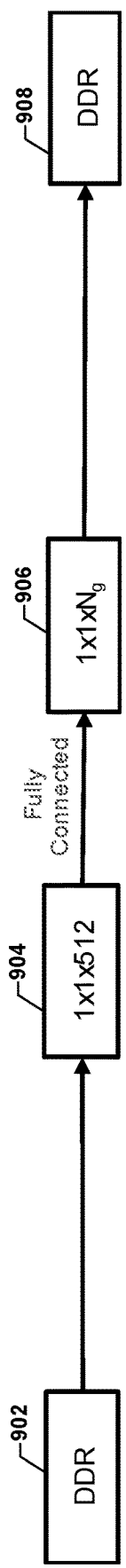

FIGS. 8 and 9 are conceptual diagrams illustrating example implementations of neural networks 800 and 900 for implementing any of the various embodiments. With reference to FIGS. 1-9, in various embodiments, the neural networks 800 and 900 represent examples of neural networks that may be used for face landmark detection. However, various neural network architectures may be used for keypoint detection in various embodiments.

With reference to FIG. 8, the neural network 800 may include layers 802-816 that perform various operations including computing an output of a layer, applying an activation function, and/or performing a down-sampling or pooling operation. Outputs from the layer 814 may include determined or estimated anchor points and/or a local landmark for regions of an image, as described. Outputs from the layer 816 may include one or more features for an image and/or region. The outputs from the layers 814 and 816 may be stored in a memory 818.

With reference to FIG. 9, the neural network 900 may include layers 904 and 906. Values such as global and local features of an image may be obtained from a memory 902 and provided to fully connected layers 904. In some embodiments, the global and local features may be concatenated and provided to the fully connected layers 904. For example, the concatenated features may have a total dimension of 64×(N+1) for N regions, where the (+1) may represent the global feature. Outputs of the fully connected layers 904 may be provided to layer 906, and the outputs of the layer 906 may be stored in a memory 908.

Figure 10:
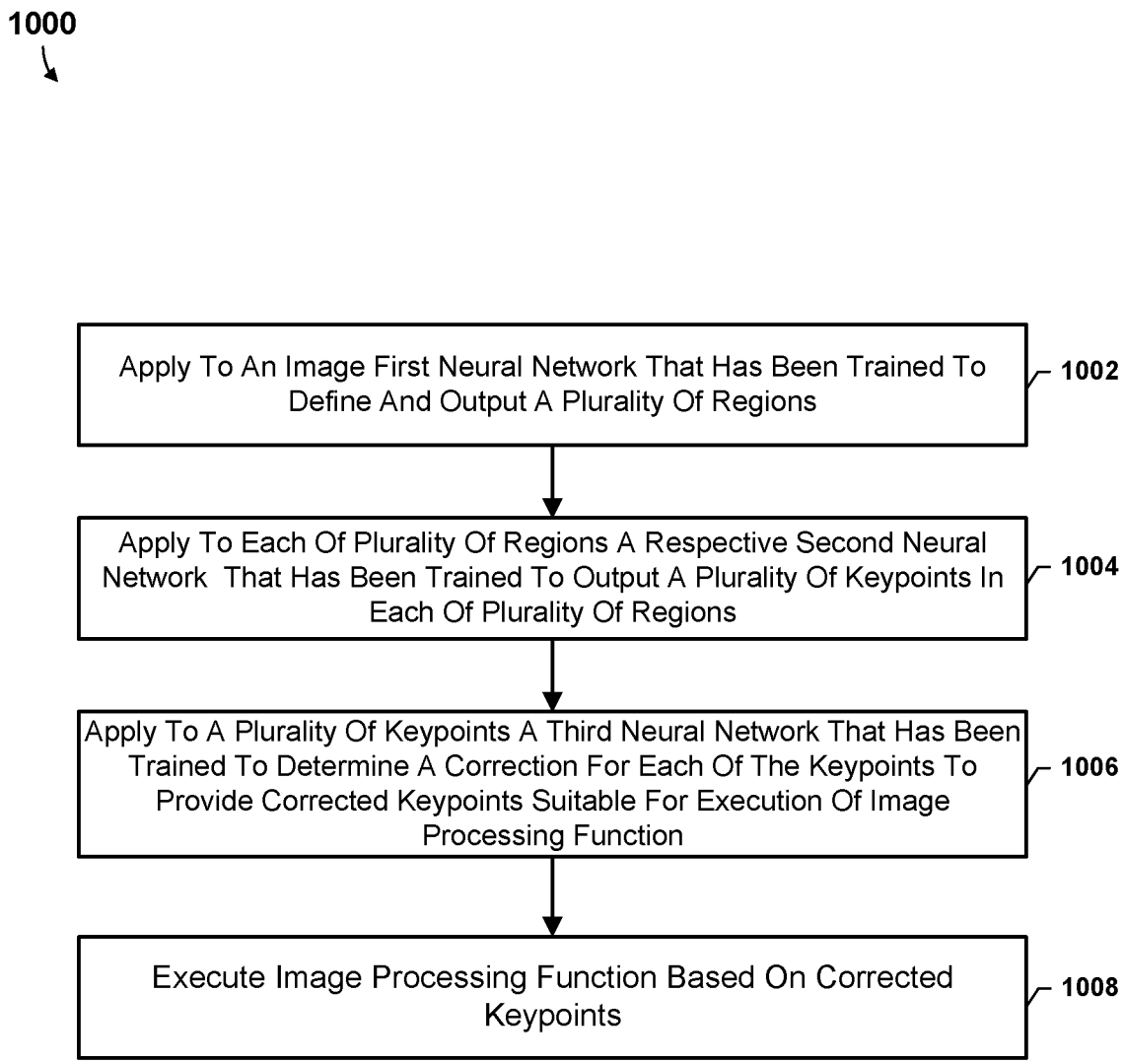
FIGS. 10-16 are process flow diagrams illustrating methods of keypoint detection in an image according to some embodiments.

FIG. 10 is a process flow diagram illustrating a method 1000 of keypoint detection in an image according to some embodiments. With reference to FIGS. 1-10, the method 1000 may be implemented by a processor (e.g., 202, 204) of a computing device (e.g., 102).

In block 1002, the processor may apply a first neural network to an image to define a plurality of regions. For example, the first neural network may be trained to segment the image of the portion of the human body into a plurality of regions, such as the regions 408a-408h.

In block 1004, the processor may apply to each of the plurality of regions a respective second neural network to obtain a plurality of keypoints in each of the plurality of regions. For example, each of the second neural networks may be trained to identify and output a plurality of keypoints 506a-506c In block 1006, the processor may apply a third neural network 602 to the plurality of keypoints to determine a correction for each of the plurality of keypoints to provide corrected keypoints suitable for the execution of an image processing function. For example, the third neural network 602 may be trained to function as a global corrector to determine the correction 608 for each of the plurality of keypoints 506a-506c. In some embodiments, the third neural network 602 may be applied to a multi-dimensional global feature for the image (e.g., the multi-dimensional global feature 406 for the image determined by the first neural network 402) to determine the correction 608 for each of the plurality of keypoints. Additionally or alternatively, in some embodiments, the third neural network 602 may be applied to a multi-dimensional local feature for each of the plurality of regions (e.g., the multi-dimensional local features 508a-508c determined by each second neural network for each respective region R) to determine the correction 608 for each of the plurality of keypoints.

In block 1008, the processor may execute the image processing function based on the corrected keypoints. In various embodiments, the image processing function may include, for example, facial recognition, face-based authentication, hand joint detection, body joint detection, photo enhancement, photo filters (e.g., adding a hat, mustache, etc. to an image of a face), or another suitable image processing function.

Figure 11:
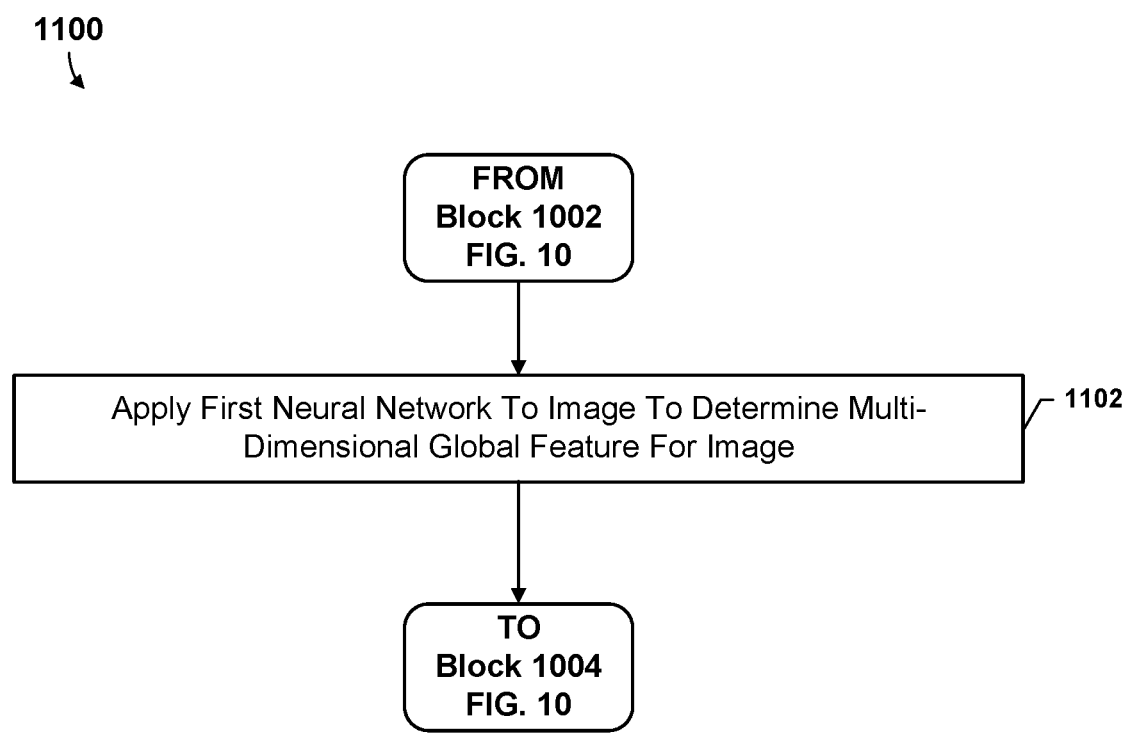

FIG. 11 illustrates a method 1100 of operations that may be performed as part of a method of keypoint detection in an image in accordance with one or more implementations. With reference to FIGS. 1-11, the method 1100 may be implemented by a processor (e.g., 202, 204) of a computing device (e.g., 102).

Following the operations of block 1002 (FIG. 10), the processor may apply the first neural network to the image to determine a multi-dimensional global feature for the image in block 1102. For example, the processor may apply the first neural network 402 to the image to determine the multi-dimensional global feature 406.

The processor may proceed to perform the operations of block 1004 (FIG. 10).

Figure 12:
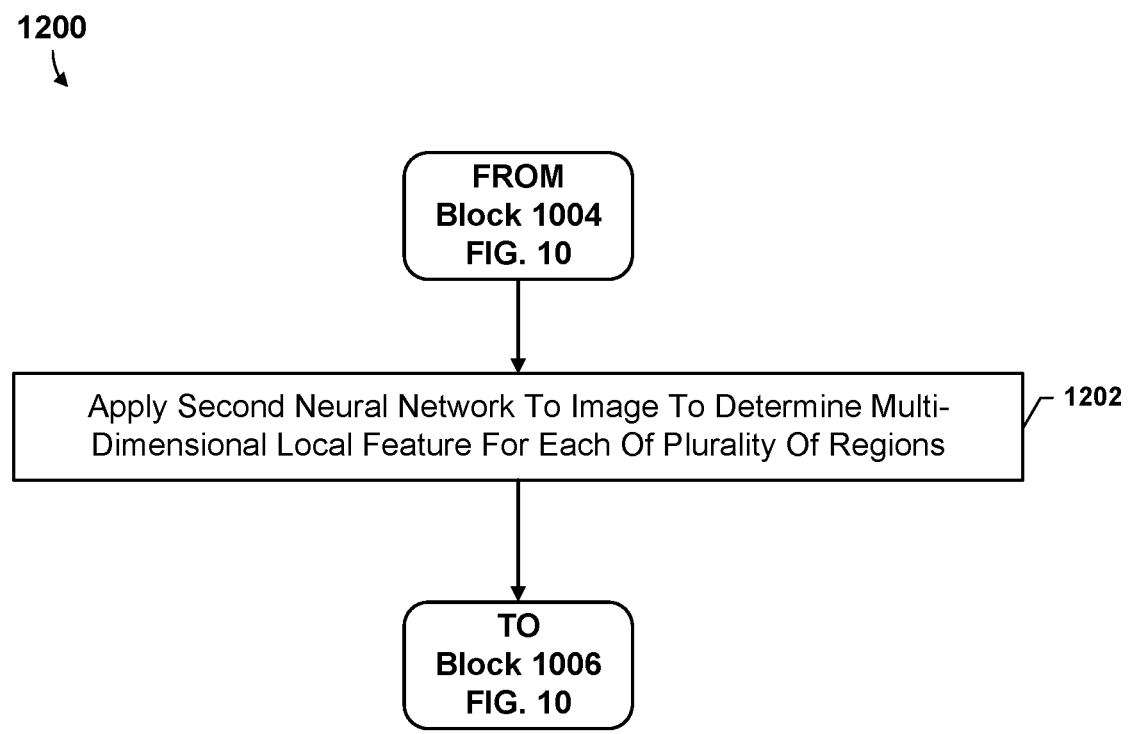

FIG. 12 illustrates a method 1200 of operations that may be performed as part of a method of keypoint detection in an image in accordance with one or more implementations. With reference to FIGS. 1-12, the method 1200 may be implemented by a processor (e.g., 202, 204) of a computing device (e.g., 102).

Following the operations of block 1002 (FIG. 10), the processor may apply the second neural network to the image to determine a multi-dimensional local feature for each of the plurality of regions in block 1202. For example, the processor may apply to each of the plurality of regions (e.g., the regions 408a-408h and the regions 502a-502c) a respective second neural network that has been trained to output a plurality of keypoints 506a-506c in each of the plurality of regions.

The processor may proceed to perform the operations of block 1006 (FIG. 10).

Figure 13:
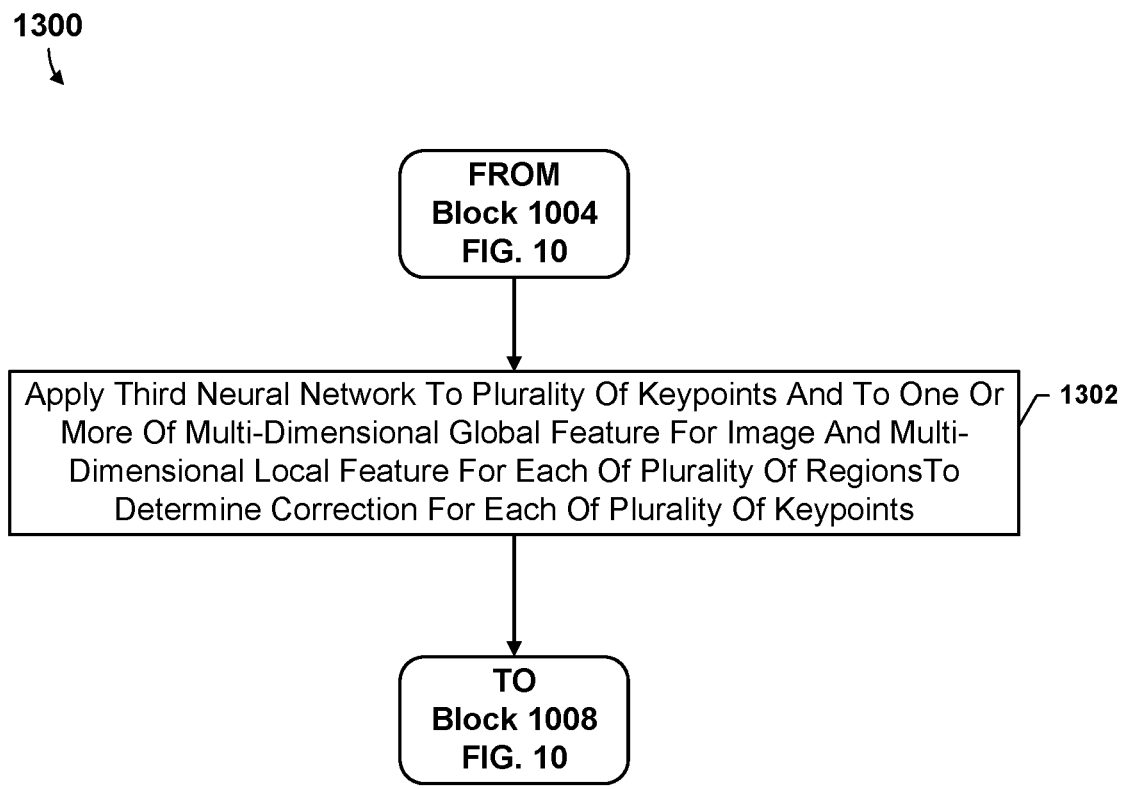

FIG. 13 illustrates a method 1300 of operations that may be performed as part of a method of keypoint detection in an image in accordance with one or more implementations. With reference to FIGS. 1-13, the method 1300 may be implemented by a processor (e.g., 202, 204) of a computing device (e.g., 102).

Following the operations of block 1004 (FIG. 10), the processor may apply the third neural network 602 to the plurality of keypoints to determine the correction for each of the plurality of keypoints based on one or more of a multi-dimensional global feature for the image and a multi-dimensional local feature for each of the plurality of regions in block 1302. For example, the processor may apply to a multi-dimensional global feature for the image (e.g., the multi-dimensional global feature 406 for the image determined by the first neural network 402) the third neural network 602 that has been trained to determine the correction for each of the plurality of keypoints. Additionally or alternatively, the processor may apply the third neural network 602 to a multi-dimensional local feature for each of the plurality of regions (e.g., the multi-dimensional local features 508a-508c determined by each second neural network for each respective region R) to determine the correction for each of the plurality of keypoints.

The processor may proceed to perform the operations of block 1008 (FIG. 10).

Figure 14:
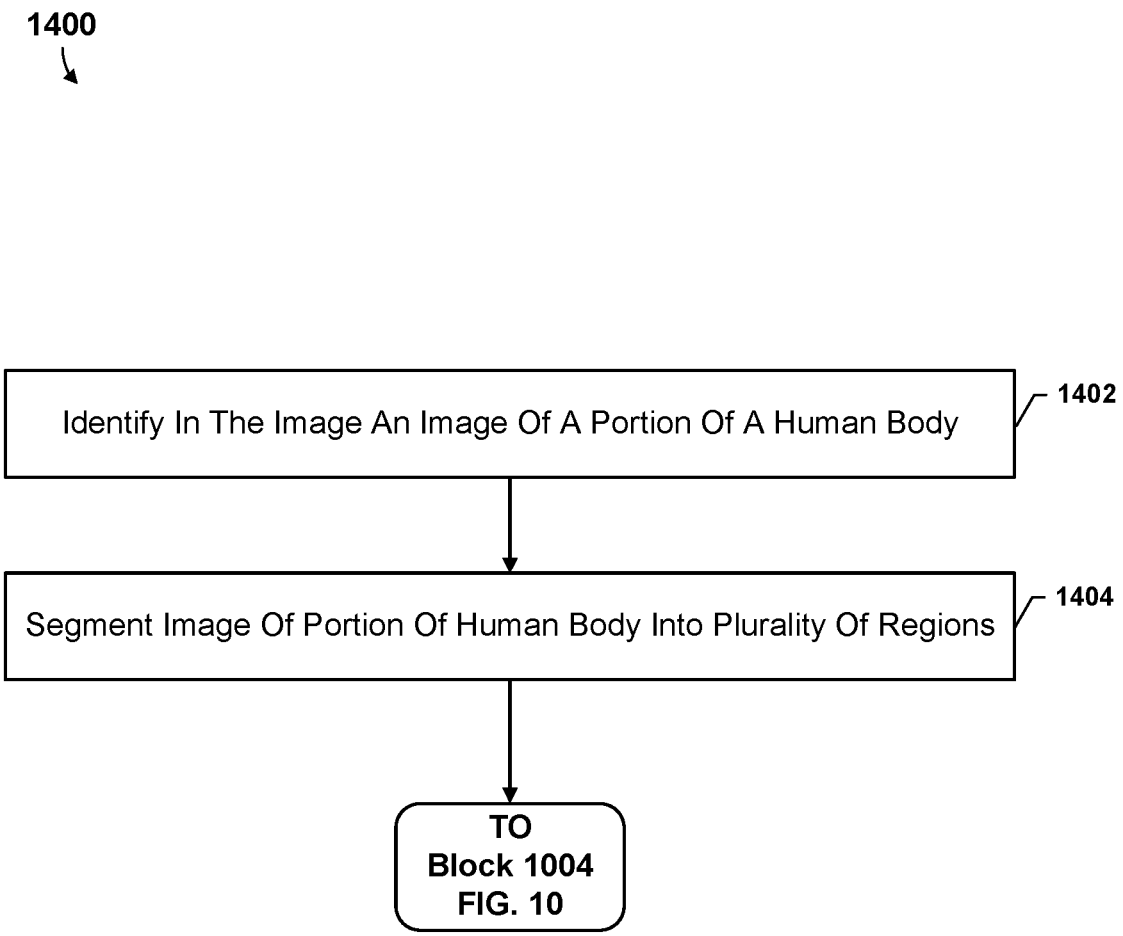

FIG. 14 illustrates a method 1400 of operations that may be performed as part of a method of keypoint detection in an image in accordance with one or more implementations. With reference to FIGS. 1-14, the method 1400 may be implemented by a processor (e.g., 202, 204) of a computing device (e.g., 102).

In block 1402, the processor may identify in the image an image of portion of a human body. For example, the processor may identify a face, a joint, a limb, or another body portion in the image.

In block 1404, the processor may segment the image of the portion of the human body into the plurality of regions.

The processor may proceed to perform the operations of block 1004 (FIG. 10).

Figure 15:
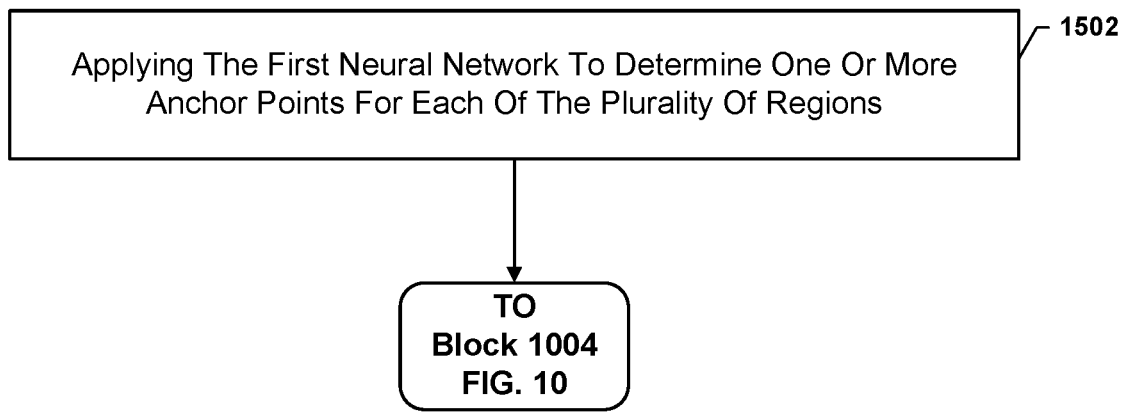

FIG. 15 illustrates a method 1500 of operations that may be performed as part of a method of keypoint detection in an image in accordance with one or more implementations. With reference to FIGS. 1-15, the method 1500 may be implemented by a processor (e.g., 202, 204) of a computing device (e.g., 102).

In block 1502, the processor may apply the first neural network to determine one or more anchor points for each of the plurality of regions. For example, the first neural network may be trained to determine one or more of the anchor points 404 for each of the regions to be determined (e.g., the regions 408a-408h).

The processor may proceed to perform the operations of block 1004 (FIG. 10).

Figure 16:
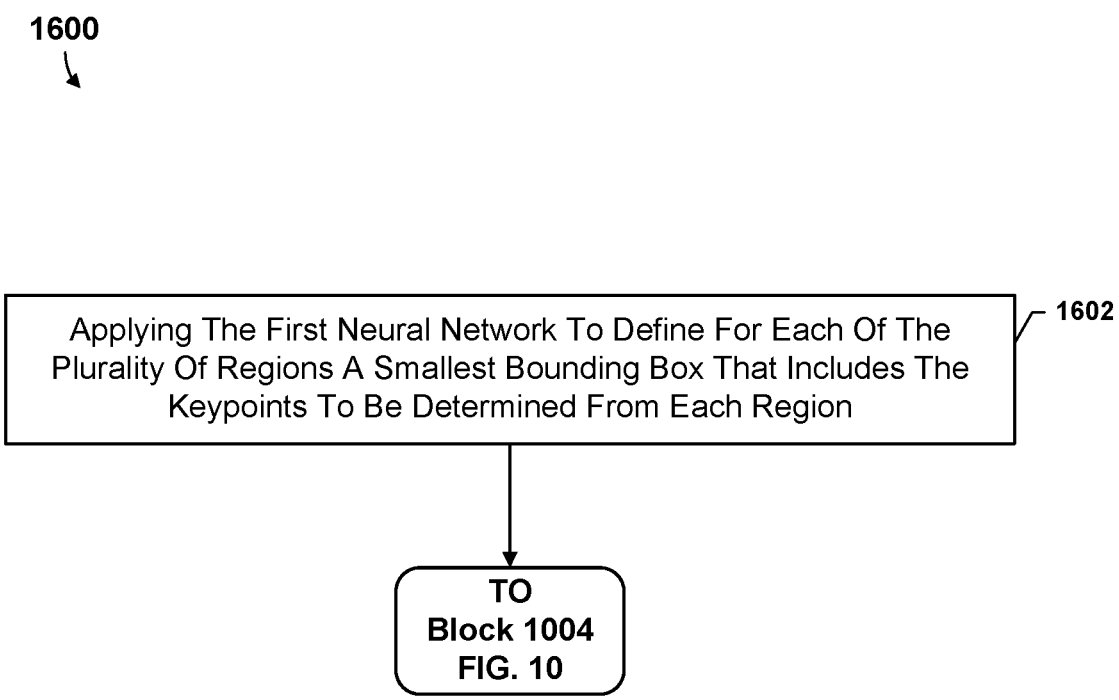

FIG. 16 illustrates a method 1600 of operations that may be performed as part of a method of keypoint detection in an image in accordance with one or more implementations. With reference to FIGS. 1-16, the method 1600 may be implemented by a processor (e.g., 202, 204) of a computing device (e.g., 102).

In block 1602, the processor may apply the first neural network that has been trained to define for each of the plurality of regions a smallest bounding box that includes keypoints to be determined from each region. In some embodiments, for each region, based on keypoints to be determined from that region, the smallest bounding box that encapsulates or includes those keypoints may be determined. In some embodiments, the first neural network may be trained to perform a regression to determine the smallest bounding box that includes keypoints to be determined for each region.

The processor may proceed to perform the operations of block 1004 (FIG. 10).

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 1000-1600 may be substituted for or combined with one or more operations of the methods 1000-1600.

Various embodiments may be implemented in any number of single or multi-processor systems. Generally, processes are executed on a processor in short time slices so that it appears that multiple processes are running simultaneously on a single processor. When a process is removed from a processor at the end of a time slice, information pertaining to the current operating state of the process may be stored in memory so the process may seamlessly resume its operations when it returns to execution on the processor. This operation state data may include the process's address space, stack space, virtual address space, register set image (e.g., program counter, stack pointer, instruction register, program status word, etc.), accounting information, permissions, access restrictions, and state information.

A process may spawn other processes, and the spawned process (i.e., a child process) may inherit some of the permissions and access restrictions (i.e., context) of the spawning process (i.e., the parent process). A process may be a heavyweight process that includes multiple lightweight processes or threads, which are processes that share all or portions of their context (e.g., address space, stack, permissions, and/or access restrictions, etc.) with other processes/threads. Thus, a single process may include multiple lightweight processes or threads that share, have access to, and/or operate within a single context (i.e., the processor's context).

The foregoing method descriptions and the process flow diagrams are provided merely as illustrative examples and are not intended to require or imply that the blocks of various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of communication devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In various embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present embodiments. Various modifications to these embodiments will be readily apparent to those skilled in the art, and the generic principles defined herein may be applied to other embodiments without departing from the spirit or scope of the embodiments. Thus, various embodiments are not intended to be limited to the embodiments shown herein but are to be accorded the widest scope consistent with the following claims and the principles and novel features disclosed herein.

What is claimed is:

1. A method of keypoint detection in an image performed by one or more processors of a computing device, comprising:
    applying to an image captured by an image sensor of the computing device a first neural network executing on the one or more processors, wherein the first neural network has been trained to define and output a plurality of regions;
    applying to each of the plurality of regions a respective second neural network executing on the one or more processors, wherein the second neural network has been trained to output a plurality of keypoints in each of the plurality of regions; and applying to the plurality of keypoints a third neural network executing on the one or more processors, wherein the third neural network has been trained to determine a correction for each of the plurality of keypoints to provide corrected keypoints suitable for execution of an image processing function.

2. The method of claim 1, further comprising executing the image processing function based on the corrected keypoints.

3. The method of claim 1, wherein applying to an image a first neural network that has been trained to define a plurality of regions comprises:
applying the first neural network to the image to determine a multi-dimensional global feature for the image.

4. The method of claim 1, wherein applying to each of the plurality of regions a respective second neural network that has been trained to output a plurality of keypoints in each of the plurality of regions comprises:
applying the second neural network to the image to determine a multi-dimensional local feature for each of the plurality of regions.

5. The method of claim 1, wherein applying to the plurality of keypoints a third neural network that has been trained to determine a correction for each of the plurality of keypoints to provide corrected keypoints suitable for the execution of an image processing function comprises:
applying the third neural network to the plurality of keypoints and to one or more of a multi-dimensional global feature for the image and a multi-dimensional local feature for each of the plurality of regions to determine the correction for each of the plurality of keypoints.

6. The method of claim 1, wherein applying to an image a first neural network that has been trained to define a plurality of regions comprises:
identifying in the image an image of portion of a human body; and
segmenting the image of the portion of the human body into the plurality of regions.

7. The method of claim 1, wherein applying to an image a first neural network that has been trained to define a plurality of regions comprises:
applying the first neural network to determine one or more anchor points for each of the plurality of regions.

8. The method of claim 1, wherein applying to an image a first neural network that has been trained to define a plurality of regions comprises:
applying the first neural network to define for each of the plurality of regions a smallest bounding box that includes keypoints to be determined from each region.

9. The method of claim 1, wherein each second neural network has been trained to output keypoints for its respective region.

10. The method of claim 1, wherein applying to each of the plurality of regions a respective second neural network that has been trained to output a plurality of keypoints in each of the plurality of regions is performed in parallel.

11. A computing device, comprising:
one or more processors configured with processor-executable instructions to perform operations comprising:
applying to an image captured by an image sensor of the computing device a first neural network executing on the one or more processors, wherein the first neural network has been trained to define and output a plurality of regions;
applying to each of the plurality of regions a respective second neural network executing on the one or more processors, wherein the second neural network has been trained to output a plurality of keypoints in each of the plurality of regions; and
applying to the plurality of keypoints a third neural network executing on the one or more processors, wherein the third neural network has been trained to determine a correction for each of the plurality of keypoints to provide corrected keypoints suitable for execution of an image processing function.

12. The computing device of claim 11, wherein the one or more processors are configured with processor-executable instructions to perform operations further comprising executing the image processing function based on the corrected keypoints.

13. The computing device of claim 11, wherein the one or more processors are configured with processor-executable instructions to perform operations such that applying to an image a first neural network that has been trained to define a plurality of regions comprises:
applying the first neural network to the image to determine a multi-dimensional global feature for the image.

14. The computing device of claim 11, wherein the one or more processors are configured with processor-executable instructions to perform operations such that applying to each of the plurality of regions a respective second neural network that has been trained to output a plurality of keypoints in each of the plurality of regions comprises:
applying the second neural network to the image to determine a multi-dimensional local feature for each of the plurality of regions.

15. The computing device of claim 11, wherein the one or more processors are configured with processor-executable instructions to perform operations such that applying to the plurality of keypoints a third neural network that has been trained to determine a correction for each of the plurality of keypoints to provide corrected keypoints suitable for the execution of an image processing function comprises:
applying the third neural network to the plurality of keypoints and to one or more of a multi-dimensional global feature for the image and a multi-dimensional local feature for each of the plurality of regions to determine the correction for each of the plurality of keypoints.

16. The computing device of claim 11, wherein the one or more processors are configured with processor-executable instructions to perform operations such that applying to an image a first neural network that has been trained to define a plurality of regions comprises:
identifying in the image an image of portion of a human body; and
segmenting the image of the portion of the human body into the plurality of regions.

17. The computing device of claim 11, wherein the one or more processors are configured with processor-executable instructions to perform operations such that applying to an image a first neural network that has been trained to define a plurality of regions comprises:
applying the first neural network to determine one or more anchor points for each of the plurality of regions.

18. The computing device of claim 11, wherein the one or more processors are configured with processor-executable instructions to perform operations such that applying to an image a first neural network that has been trained to define a plurality of regions comprises:
applying the first neural network to define for each of the plurality of regions a smallest bounding box that includes keypoints to be determined from each region.

19. The computing device of claim 11, wherein the one or more processors are configured with processor-executable instructions to perform operations such that each second neural network has been trained to output keypoints for its respective region.

20. The computing device of claim 11, wherein the one or more processors are configured with processor-executable instructions to perform operations such that applying to each of the plurality of regions a respective second neural network that has been trained to output a plurality of keypoints in each of the plurality of regions is performed in parallel.

21. A computing device, comprising:
  means for applying to an image captured by an image sensor of the computing device a first neural network executing on one or more processors, wherein the first neural network has been trained to define and output a plurality of regions;
  means for applying to each of the plurality of regions a respective second neural network executing on the one or more processors, wherein the second neural network has been trained to output a plurality of keypoints in each of the plurality of regions; and
  means for applying to the plurality of keypoints a third neural network executing on the one or more processors, wherein the third neural network has been trained to determine a correction for each of the plurality of keypoints to provide corrected keypoints suitable for execution of an image processing function.

22. A non-transitory processor-readable storage medium having stored thereon processor-executable software instructions configured to cause one or more processors of a computing device to perform operations comprising:
  applying to an image captured by an image sensor of the computing device a first neural network executing on the one or more processors, wherein the first neural network has been trained to define and output a plurality of regions;
  applying to each of the plurality of regions a respective second neural network executing on the one or more processors, wherein the second neural network has been trained to output a plurality of keypoints in each of the plurality of regions; and
  applying to the plurality of keypoints a third neural network executing on the one or more processors, wherein the third neural network has been trained to determine a correction for each of the plurality of keypoints to provide corrected keypoints suitable for execution of an image processing function.

23. The non-transitory processor-readable storage medium of claim 22, wherein the stored processor-executable software instructions are configured to cause the one or more processors of the computing device to perform operations further comprising executing the image processing function based on the corrected keypoints.

24. The non-transitory processor-readable storage medium of claim 22, wherein the stored processor-executable software instructions are configured to cause the one or more processors of the computing device to perform operations such that applying to an image a first neural network that has been trained to define a plurality of regions comprises:
  applying the first neural network to the image to determine a multi-dimensional global feature for the image.

25. The non-transitory processor-readable storage medium of claim 22, wherein the stored processor-executable software instructions are configured to cause the one or more processors of the computing device to perform operations such that applying to each of the plurality of regions a respective second neural network that has been trained to output a plurality of keypoints in each of the plurality of regions comprises:
  applying the second neural network to the image to determine a multi-dimensional local feature for each of the plurality of regions.

26. The non-transitory processor-readable storage medium of claim 22, wherein the stored processor-executable software instructions are configured to cause the one or more processors of the computing device to perform operations such that applying to the plurality of keypoints a third neural network that has been trained to determine a correction for each of the plurality of keypoints to provide corrected keypoints suitable for the execution of an image processing function comprises:
  applying the third neural network to the plurality of keypoints and to one or more of a multi-dimensional global feature for the image and a multi-dimensional local feature for each of the plurality of regions to determine the correction for each of the plurality of keypoints.

27. The non-transitory processor-readable storage medium of claim 22, wherein the stored processor-executable software instructions are configured to cause the one or more processors of the computing device to perform operations such that applying to an image a first neural network that has been trained to define a plurality of regions comprises:
  identifying in the image an image of portion of a human body; and
  segmenting the image of the portion of the human body into the plurality of regions.

28. The non-transitory processor-readable storage medium of claim 22, wherein the stored processor-executable software instructions are configured to cause the one or more processors of the computing device to perform operations such that applying to an image a first neural network that has been trained to define a plurality of regions comprises:
  applying the first neural network to determine one or more anchor points for each of the plurality of regions.

29. The non-transitory processor-readable storage medium of claim 22, wherein the stored processor-executable software instructions are configured to cause the one or more processors of the computing device to perform operations such that applying to an image a first neural network that has been trained to define a plurality of regions comprises:
  applying the first neural network to define for each of the plurality of regions a smallest bounding box that includes keypoints to be determined from each region.

30. The non-transitory processor-readable storage medium of claim 22, wherein the stored processor-executable software instructions are configured to cause the one or more processors of the computing device to perform operations such that each second neural network has been trained to output keypoints for its respective region.

* * * * *